United States Patent
Bloom et al.

(10) Patent No.: US 10,310,819 B2
(45) Date of Patent: Jun. 4, 2019

(54) METHOD AND APPARATUS FOR PROVIDING SYMBOLIC MODE CHECKING OF BUSINESS APPLICATION REQUIREMENTS

(75) Inventors: Bard Bloom, Yorktown Heights, NY (US); Ian D. Simmonds, Dobbs Ferry, NY (US); Paul T. Keyser, New York, NY (US); Mark N. Wegman, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 12/544,933

(22) Filed: Aug. 20, 2009

(65) Prior Publication Data
US 2009/0313091 A1 Dec. 17, 2009

Related U.S. Application Data

(62) Division of application No. 10/201,114, filed on Jul. 22, 2002, now abandoned.

(60) Provisional application No. 60/307,190, filed on Jul. 23, 2001.

(51) Int. Cl.
*G06F 8/10* (2018.01)
*G06Q 10/06* (2012.01)

(52) U.S. Cl.
CPC .......... *G06F 8/10* (2013.01); *G06Q 10/067* (2013.01); *G06Q 10/0637* (2013.01); *G06Q 10/06375* (2013.01); *Y04S 10/54* (2013.01)

(58) Field of Classification Search
CPC .............. G06F 8/10; G06Q 10/0637; G06Q 10/06375; G06Q 10/067; Y04S 10/54
See application file for complete search history.

(56) References Cited

U.S. PATENT DOCUMENTS

| | | | |
|---|---|---|---|
| 5,019,961 A | | 5/1991 | Addesso |
| 5,490,097 A | | 2/1996 | Swenson |
| 5,734,837 A | * | 3/1998 | Flores et al. .......... 705/7.13 |

(Continued)

OTHER PUBLICATIONS

Clarke et al. "Automatic verification of finite-state concurrent systems using temporal logic specifications." ACM Transactions on Programing Languages and Systems, 8(2): 244-263, 1996.*
Speck et al. Validation of business process models. (2003) Proceedings of ECOOP2003 Workshop Correctness of Model-based Software Composition (CMC), Darmstadt, pp. 75-83.*
(Continued)

*Primary Examiner* — Sujay Koneru
(74) *Attorney, Agent, or Firm* — Cantor Colburn LLP; Rahan Uddin

(57) ABSTRACT

A system and method for providing symbolic mode checking of business application requirements. A language allows for building a model for the business process, the model comprising a plurality of actions, with each action having a precondition and a postcondition or outcome. Specifications are constructed for the properties of the business applications with the specifications describing both the states of the business process and the order in which they may occur. Finally, the model and the specifications are analyzed to determine if the model satisfies the specifications. If the model fails to satisfy the specifications, a problem may be indicated in the business application. The process can be automated to permit the system to make assumptions for conducting a thorough analysis of selected potential problem areas in the application.

8 Claims, 3 Drawing Sheets

(56) References Cited

U.S. PATENT DOCUMENTS

| | | | |
|---|---|---|---|
| 5,768,498 A * | 6/1998 | Boigelot et al. | 714/39 |
| 6,009,405 A * | 12/1999 | Leymann et al. | 705/7.27 |
| 6,216,098 B1 * | 4/2001 | Clancey et al. | 703/6 |
| 6,308,163 B1 * | 10/2001 | Du et al. | 705/7.25 |
| 6,393,386 B1 | 5/2002 | Zager | |
| 6,405,159 B2 * | 6/2002 | Bushey et al. | 703/13 |
| 6,662,355 B1 * | 12/2003 | Caswell et al. | 717/103 |
| 6,725,431 B1 * | 4/2004 | Yang | 716/107 |
| 6,789,252 B1 * | 9/2004 | Burke et al. | 717/100 |
| 7,120,568 B1 * | 10/2006 | Geist et al. | 703/13 |
| 7,503,032 B2 * | 3/2009 | Bhaskaran et al. | 717/104 |
| 7,925,527 B1 * | 4/2011 | Flam | 705/7.26 |
| 2002/0169658 A1 | 11/2002 | Adler | |
| 2002/0178423 A1 | 11/2002 | Ben-David | |
| 2002/0194039 A1 * | 12/2002 | Bhaskaran et al. | 705/7 |
| 2003/0167182 A1 * | 9/2003 | Bloom et al. | 705/1 |
| 2004/0103396 A1 * | 5/2004 | Nehab | 717/127 |
| 2005/0187809 A1 * | 8/2005 | Falkenhainer | 705/9 |
| 2007/0168988 A1 * | 7/2007 | Eisner et al. | 717/126 |
| 2007/0244910 A1 * | 10/2007 | Mital et al. | 707/100 |
| 2009/0222249 A1 * | 9/2009 | Wang et al. | 703/13 |

OTHER PUBLICATIONS

Fu et al. "Formal Verification of E-Services and Workflows" (2002) Deparment of Computer Science. University of California at Santa Barbara (http://www.cs.ucsb.edu/~bultan/publications/wes02.pdf).*

Xu et al. "Performance Optimization of Temporal Reasoning for Grid Workflows Using Relaxed Region Analysis" (2008) Proc. of the 2nd IEEE Int. Conf. on Advanced Networking and Applications Workshops, pp. 187-194.*

Schroeder "Verification of business processes for a correspondence handling center using CCS" (1999) In Proc. European Symp. on Validation and Verification of Knowledge Based Systems and Components.*

Lichtenstein et al. "Checking That Finite State Concurrent Programs Satisfy Their Linear Specification" (1984) ACM 0-89791-147-4/85/001/0097 (http://lsi.ugr.es/~mcapel/docencia/doctorado/seguro/TL_artl/lichtensteinPnueli95.pdf).*

"RuleBase Parallel Edition", ACM, Feb. 8, 1999, pp. 1-3.

Chan, et al, "Improving Efficiency of Symbolic Model Checking for State-Based System Requirements", ISSTA, 1998.

* cited by examiner

| QUANTIFIER | MEANING |
|---|---|
| some | One or more elements of the domain satisfy the property |
| all | All the elements of the domain satisfy the property |
| no | No element of the domain satisfies the property; opposite of some |
| one | Exactly one element of the domain satisfies the property; cf. the $\wedge$ operation |
| at-most-one | Zero or one elements of the domain satisfy the property; cf, the # operation |

FIGURE 1

```
// strix...
Spec onlyManagersManage :>
        (surely henceforth, all p:PERSON,
                ((some q:PERSON (manages(p,q) )) --> p: Manager));

// ... SMV (word-wrapped: this is actually a single line of text)
SPEC
Spec.onlyManagersManage&(AG ((((((rel-manages.at-Arwen-Arwen) |
(rel-manages.at-Arwen-Bran) |(rel-manages.at-Arwen-Cefyn) | (rel-manages.at-Arwen-Dafyd) |
->(Arwen.v-Person-management=id-Person-management-Manager)))) &
((((rel-manages.at-Bran-Arwen) |(rel-manages.at-Bran-Bran) |(rel-manages.at-Bran-Cefyn) |
(rel-manages.at-Bran-Dafyd)->(Bran.v-Person-management=id-Person-management-Manager))))
& ((((rel-manages.at-Cefyn-Arwen) |(rel-manages.at-Cefyn-Bran) |
(rel-manages.at-Cefyn-Cefyn) |(rel-manages.at-Cefyn-Dafyd)
->(Cefyn.v-Person-management=id-Person-management-Manager)))) &
((((rel-manages.at-Dafyd-Arwen) |(rel-manages.at-Dafyd-Bran) |(rel-manages.at-Dafyd-Cefyn)
|(rel-manages.at-Dafyd-Dafyd)
->(Dafyd.v-Person-management=id-Person-management-Manager))))))
```

FIGURE 2

METHOD AND APPARATUS FOR PROVIDING SYMBOLIC MODE CHECKING OF BUSINESS APPLICATION REQUIREMENTS

The present application claims priority to U.S. Provisional application 60/307,190 filed Jul. 23, 2001.

FIELD OF THE INVENTION

The invention relates generally to the field of business applications and more particularly to a method and apparatus for performing preliminary checking of business application models to detect potential defects.

BACKGROUND OF THE INVENTION

Business applications have gained widespread use, despite their complexity and the difficulty in accurately projecting their performance. Businesses use applications for tasks including reimbursing employees for travel expenses, ordering notebooks and other office supplies, allocating office and cubicle space, and other routine trivia, as well as for more complex tasks such as the bookkeeping and organizational procedures by which on-line auction houses organize auctions, banks handle checks, insurance companies decide what sort of policy to issue, railroad companies track trains' locations and contents, etc. Business applications need to be flexible in ways that more typical, linear computer programs do not. As an example, a business application which automatically processes employee travel vouchers must be capable of evaluating a plurality of contingent conditions (e.g., employee status, employee travel allocations, expenditure ceilings, approval requirements, etc.) and of processing or routing requests based on the evaluation of those conditions. Further, business applications necessarily rely heavily on human action, such as when human judgment is essential to a resolution of an atypical transaction. Well-designed business systems have escape commands in which privileged users (e.g., managers) can "violate" the general requirements and invariants of the system as necessary in order to deal with reality.

For preliminary diagnostic purposes, with the intent of eliminating "bugs" during software design, it is desirable to create models of the software which demonstrate where problems may occur in the finished product. Due to the nature of business applications, the behavior of fully-developed business applications is somewhat unpredictable and tends to be difficult to model. Nonetheless, given the fact that business applications are expensive to develop and use, and generally even more expensive to retrofit when bugs have been detected after the applications are in user it is prudent to evaluate the applications in the early design to locate detectable defects by modeling the behavior of the application. The desire for detecting defects is realistically offset by the practicalities of modeling. Clearly not all behaviors can be checked unless the entire application is executed, which would be a prohibitively lengthy and intensive modeling process.

Model checking is a preferred method for formally evaluating the behavior of a business application. In model checking, such as is detailed in the publications entitled *Model Checking* by E. M. Clarke, et al, MIT Press, (Cambridge, Mass., 1999) and *Model Checking Large Software Specifications* by N. Carriero, et al, IEEE Transactions on Software Engineering, pages 498-519 (July 1998), a system is described as a finite-state model and a desired property of the system is expressed as a logical formula. Having the finite-state model and the logical formula, it can be determined whether the system has the desired property. While computationally complex applications cannot realistically be fully modeled, due to exponential expansion of the possible decision paths, many useful cases can be analyzed.

Ordered Boolean Decision Diagrams (OBDDs) have been a very successful approach to model checking, providing a compact canonical notation for Boolean expressions, in which all the basic operations are efficiently computable. The model must be phrased as Boolean formulas, for example, with the state s as a vector of Boolean variables, formulas St(s) describe the possible start states, and Trans (s,t) describing when the system can take a transition from s to t. The multi-step behavior of the system can then be computed from these (e.g., the set of reachable states is computed from the transitive closure:

$\{r | \exists s \ . St \ (sTrans(s,t)\}$.

Temporal logic formulas (e.g., Computation Tree Logic or CTL), can also be expressed as OBDDs. Checking whether or not the model satisfies the formula then becomes a matter of calculation. In many useful cases, OBDD calculations can be done quickly. This approach has verified properties of system with astounding numbers of states, currently up to $10^{120}$ for well-designed systems and properties. Model checking with such systems, however, takes a significant amount of human work in setting up the problem. Therefore, while model checking has theoretical potential in many arenas, it has primary usefulness in the areas of protocol checking and circuit checking, wherein the models are inherently small and of regular structure. Model checking has had limited applicability in checking routine software.

With regard to software checking, model checking has been used not for verification but for so-called falsifying of properties, wherein selected bugs in the system can be targeted and found. For example, one may see if a protocol can deadlock or a memory management chip can lose a page. Clearly, these are important properties to identify and correct. Checking a handful of well-chosen properties can catch many errors, and can increase confidence that remaining errors are scattered and more benign. Some properties, however, may simply be too hard to check.

Additional shortcomings of model checking include the fact that the models must be kept as small as possible, due to the fact that even a bit or two in the wrong place can greatly increase computation time. By reducing model size, however, one necessarily sacrifices some degree of certainty that the model is adequate for its checking purposes. It must also be recognized that the real system (i.e., the business application being checked) is must larger than the model and that verification via the model which concludes that an application does not produce errors in its execution of four consecutive processes cannot predict that the application will not lock upon execution of the fifth process.

Therefore, it is desirable, and is an object of the present invention, to provide a method and apparatus for checking a business application for detectable defects in the early application design using model checking.

It is another object of the invention to provide a method and apparatus for applying model checking for verification of selected aspects of business application software.

Yet another object of the invention is to provide a method which gives a total, programmatic description of classes and activities of a business application as well as a partial, logical description of specifications therein.

SUMMARY OF THE INVENTION

The foregoing and other objectives are realized by the present invention comprising a system and method for determining if a business process satisfies certain properties, the method comprising building a model for the business process, the model comprising a plurality of actions each having a precondition and a postcondition, constructing specifications for the properties which describe both the states of the business process and the order in which they may occur, and determining if the model satisfies the specifications, wherein failure to satisfy the specifications indicates that the model (and the underlying business application) is problematic and requires some modification.

BRIEF DESCRIPTION OF THE DRAWINGS

The invention will now be described in greater detail with specific reference to the appended drawings wherein:

FIG. 1 illustrates a chart of quantifiers which can be used with the present invention;

FIG. 2 illustrates the conversion from the inventive language to SMV;

DETAILED DESCRIPTION OF THE INVENTION

Figure 3:
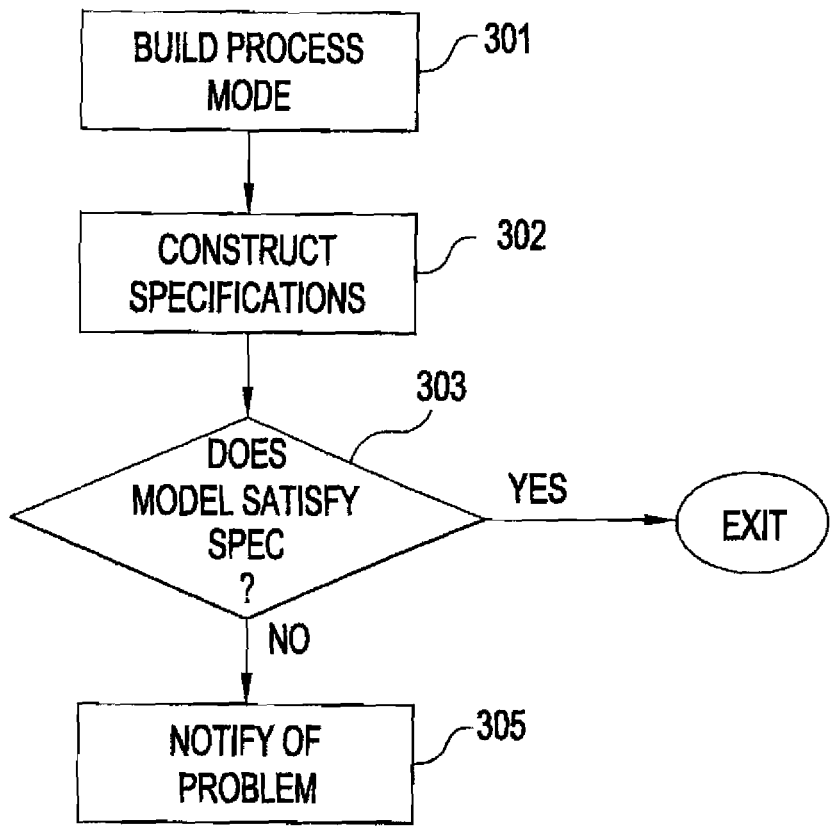
FIG. 3 illustrates a process flow for implementing the inventive process.

To model business applications, it is first to be recognized that business software tends to be very data-driven. A great many human-computer interactions involve recording data, entering names and addresses on applications, recording boxes of supplies received at loading docks, etc. The program's decisions, and the decisions that it presents to users, are typically conditioned on data. For example, a travel reimbursement for less than $100/day might be automatically accepted and paid, whereas a more expensive one might need a manger's approval, and one for $1500/day might require a series of approvals at higher management levels.

Partially as a consequence of this, under the present invention, business data is multiply, dynamically categorized. Multiple categorization models the fact that a person might be an employee or a customer, both, or neither. Dynamic categorization captures the fact that a person can be hired or fired. Standard object models, even multiple inheritance models, don't capture this very well, since employee and customer cannot usefully be made subclasses of person in most programming languages. Nonetheless, experience suggests that multiple dynamic classification is a good way to think about and describe business data.

Business data can be described by Classes and Aspects. The Classes classify information such as person, employee, customer, male, female. Aspects group mutually exclusive sets of classes, for example person gender includes male and female, and models the fact that a given person can be at most only one of the two at any instant. An aspect with only one element represents an option: for example, person.employment denotes the single aspect employee. An object may have classes in different aspects at the same time, such that a given person may be both an employee and a male.

Changing one class may trigger changes to others, for example firing an employee involves removing their employee classification. If x is a manager (and hence an employee), firing him removes his manager classification as well as his employee classification. Conversely, hiring someone to be a manager turns them into an employee as well.

Business decisions are generally guided or constrained by the categorization. Insurance policies have different behavior depending upon the gender, marital status, etc. A travel reimbursement form might have classifications including Submitted, Approved, Paid, which may track the progress of the form through the process, and LowPrice, NormalPrice, HighPrice, based on the amount being sought. When the form is Submitted and NormalPrice, it will be given to a Manager for approval; and, upon approval, will be switched to the Approved classification.

Models of business application have been built (cf: ISO10746-2,ISO10165-7) for explanation but not implemented. A system consists of a data model and a control model. Data is a collection of objects, together with some relationship between them. The objects are in a multiple dynamic classification hierarchy, they have many classes, and they can change classes as the application proceeds. The running example of the travel invoice processing system will be used as an example:

```
//Define a classification for travel forms...
class TravelForms
//the status of a form tells where it is
//in the approval application
aspect status : TravelForm;
class Submitted,Approved,Rejected:TravelForm.status;
//The cost of a form tells whether the amount
//being asked for is reasonable.
aspect cost : TravelForm;
class LowCost,MediumCost,HighCost: TravelForm.cost;
```

Once a form is Approved, it may at some point be Paid:

```
aspect payment: Approved;
Class Paid : Approved.status
```

Note that it is impossible for tf to be both Paid and Rejected. Paid is a subclassification of Approved, and Approved and Rejected are mutually exclusive.

The model also permits mappings (partial or total functions) and general relationships between entries. For example, a suitable definition of sets of objects TRAVELFORMS and PEOPLE is assumed. In some systems, these will simply be all entities of type TravelForm and Person.

```
//Relationship: who submitted the form?
map submitter: (TRAVELFORM -> PERSON, partial;
//Relationship: management
rel manages : PERSON *PERSON;
//Also keep track of who approved what
rel signedOffOn : TRAVELFORM -> PERSON;
```

Control consists of a collection of activities, running asynchronously. An activity represents some agent (human or automated) using a subsystem, such as: a manager using the application to approve travel forms, a program evaluating applications and routing them to the correct people, and so on. Activities may correspond to highly abstracted versions of large subsystems (e.g., invocations of legacy applications).

Activities have preconditions under which they can execute and have outcomes. Outcomes perform some computation, thereby changing entity classifications and relationships. An activity may have several outcomes and some agent, human or computer, will choose one of the outcomes each time the activity is executed. Activities are assumed to be atomic, and non atomic events can be modeled as sequences of activities. For example:

```
act judgeTravelForm (tf: TRAVELFORM, subm :PERSON
appr: PERSON)
    pre
        (tf :MediumCost)& (tf: Submitted)
        & (submitter(tf) = subm
        & (manager(appr,subm))
    pick
        outcome DoAcceptance :>
            now tf : Approved, signedOffon(tf, appr);
        outcome DoRejection :>
            now tf : Rejected;
    end-pick
end-act
```

The judgeTravelForm activity applies to submitted, medium-cost travel forms. Once the traveler fills out the form, the result is an entity tf which is in state Submitted and MediumCost. When that happens, the activity may fire (i.e., proceed to the next step). Other activities may be enabled as well, of course. When an activity fires, one of two things will happen: the travel form may be approved with appr recorded as the one who approved it, or it may be rejected.

There is no explicit sequencing between activities; however, preconditions can provide implicit sequencing since one set of activities can wait for a condition that another one sets.

Once the model is defined, specifications may be added. The system will test them, and will report either that they are true or will give a (partial) counterexample. For example, it may be desirable that, if a travel form has not already been rejected, it might eventually be paid, as shown below:

```
spec outcomeIsAlwaysPossible:>
    always, all tf: TF.
        !(tf:Rejected)->(somehow eventually tf:Paid);
```

The foregoing general style of model, allowing some flexibility in the details, has been quite useful in describing business application. The descriptions are quite abstract, describing data and computation fairly coarsely (for example, the actual cost of the trip will not be recorded at this point in the modeling). This methodology emphasizes recording the important criteria, the distinctions upon which the decisions are to be made, while suppressing details that will not be relevant until later in the implementation.

The model is good for describing business applications in a reasonable level of detail. The description can serve as a specification of the system, and can be a basis for a more detailed analysis. The act of description has value, for it forces people to think about their needs and requirements in detail.

The description of a complex system in necessarily inadequate since it is hard to understand or predict how the system as a whole will behave. The single-step behavior from a particular state is easy to understand since it is clear which activities and outcomes will fire (i.e., if A, then B). However, the multi-step behavior can be difficult to model (i.e., if A, then B or C or D; and if B, then Q, if C then R, and if D then S). Using the example of an online auction system, it is recognized that one activity may allow an administrator to stop an auction at any time, which is a crucial capability, particularly since an auction house must be able to deal summarily with illegal or immoral auctions. Other activities allow buyers to pay sellers on-line and for sellers to deliver digital auction items on-line. As an example, it would be unreasonable to have a system-wide requirement that an item must be delivered once paid for, since there may be instances (e.g., death of a seller) where such is unreasonable. It would be reasonable, though, to have a system requirement that the system not prevent a seller from sending a payed-for item.

Clearly the requirements in the foregoing examples, if formalized in the most obvious way, are inconsistent. If the administrator stops the auction after the buyer has paid and before the seller has delivered, then the seller cannot deliver. Such an issue is not hard to address once it has been identified. However, identifying it by looking at the specification for the application can be quite difficult, particularly because the relevant activities are only a few among dozens of candidate scenarios and are widely separated in terms of definition and anticipated reaction/result. Therefore, the foregoing is best characterized as a temporal specification, to with, "If the buyer has paid and the seller has not delivered, then it is possible that the seller eventually delivers". Note that the delivery need not be enabled at that instant, it must simply be possible at some future time.

It is, therefore, proposed that specifications at this level of development of the application are good subjects for model checking for the following reasons: fairly abstract models can be done at a size and degree of formality which is technologically suitable for symbolic model checking; the model of computation which is most suitable for describing business application is data-driven; and, model checking of business application specifications can occur early in the "lifecycle" of the application, thereby allowing for relatively easy and inexpensive correction. Since model checking research has largely focused on circuits and protocols, current languages are largely tuned for those domains. Therefore, a new language is needed which is aimed at describing business application in terms with which business application modelers are familiar. The language is constrained in ways that ensure that all specifications are finite state programs and thus checkable modulo resources which can be checked against CTL specifications or can be executed by hand in an interpreter.

The modeling language consists of definitions of data and activities, plus some specifications which should be checked. Data comprises entities and relationships. Entities are statically described as a multiple dynamic classification hierarchy, with classification and aspect definitions as detailed above. Object is the built-in root class; Object.sub is a built-in aspect of it used for subclasses in the object orientation (OO) sense. To illustrate:

```
class Person, Auctionable :Object.sub:
    aspect age, job, online: Person;
    class Adult : Person.age;
        // x is a child if x is not an adult
    class Buyer, Seller, Admin: Person.job;
    class On; Off: Person.online.
```

Entities must be declared explicitly, with permanent and initial classes given. This declares a Person, an Adult and Buyer who is initially Off(line). That person will stay an Adult and Buyer forever, but the online status may change. For example:

Entity Arwen: Adult, Buyer:=Off;

Entities may be grouped into domains, which are static structures used for abstraction. Domains can overlap and be heterogeneous. To illustrate:

```
Domain BUYER = (Arwen, Eleri)
Domain ADULT = (Arwen, Huw, Cefyn);
```

It is occasionally useful to have things in domains which are not entities, but which can be used in relations and maps, as shown below;

```
nonentity CardiffBay; MountSnowdon;
domain WELSHTHING =(Arwen, Eleri, Huw, Cefyn,
    CardiffBay, MountSnowdon);
```

The ordering of elements in a domain is significant. It is to be noted that entities do not have attributes or properties. Data about individual entities is expressed as classifications and data relating several entities is expressed as relations and maps. Relations and maps are essentially mutable versions of the mathematical constructs. To illustrate:

```
rel owns: (PERSON, AUCTIONABLE);
    init (Arwen, CarvedSpoon);
``` defines the relationship owns, which will be used to model who owns what. Initially Arwen owns a carved spoon, though this may change as the system computes. Relations may be declared to be reflexive, irreflexive, symmetric, and/or unchanging. All of these declarations save bits in the model checker, and provide useful invariants that are automatically enforced. For example:

```
rel nextTo: (PERSON, PERSON)
    irreflexive, symmetric;
``` describes who is next to whom. Nobody is next to themselves (hence the relation is reflexive); and if one person is next to another, the other is next to the one (hence it is symmetric).

Maps model total or partial functions, such as:
map owner: AUCTIONABLE→PERSON;
which is one way to say who currently owns what. Maps may be partial, unchanging, initialized, or have symmetries between selected sets of arguments, as shown below:
map spouse: PERSON→PERSON, partial;
The expressive language of the invention is tuned for writing specifications for modeling of business applications. The primitive expressions are directly related to the kinds of data:

```
p = On // True iff p is logged on
    //(vix., if p has class On)
P ! : Buyer//True if p is not the Buyer
owns (p,q) //true if p owns q
owner(q) = p //true if the owner of q is p
spouse(p) = undefined //true if p has no spouse
p= Arwen //true if p is Arwen
```

Domains are ordered, and the order can be queried. Since objects can belong to several domains, and may be in different orders in different domains, the domain of comparison must be specified. Comparisons also may be chained, as shown below:
p<Arwen<=q IN PEOPLE
Boolean expressions are the heart of business applications, expressing conditions under which an activity is available, or the requirements on the system, and can get quite complex. The Boolean operations for the present invention are designed to cut down on parenthesis, redundant subexpressions, and visual ambiguity.

Six Boolean combinators are used, including &, |, →, and ⇔, for conjunction, disjunction, implication, and equivalence, as is usual in many systems. The others are n-ary operations: A^B^C^ . . . ^Z is true when precisely one of A, B, C . . . , Z is true, and A#B#C# . . . # Z is true when at most one of them is true. These frequently need to be said in specifications, and are hard to say compactly and readably with only the standard operations.

Boolean implication and equivalence are not associative operations. The inventive language has a nonstandard but useful meaning for iterated → and ⇔. A→B→C is interpreted as (A→B) & (B→C), and similarly for ⇔. This allows specifying nested predicates, e.g., saying that the high bidder in an auction must have made some high bid in that auction, and that in turn means she has looked at the auction, as shown below
highBidderIn(b,a)→hasBidIn(b,a)→hasLookedAt(b,a)

Expressions of the form A & B|C look ambiguous. They are not ambiguous in any actual computer language, but it can be hard to remember which operation takes precedence, or which way it associates if neither takes precedence. It would be even harder to keep track of precedence relations among the six combinators. The inventive language does not allow this sort of visual ambiguity: A & B|C is syntactically illegal. (A & B)|C and A & (B|C) are legal, of course.

However, this could easily lead to masses of parentheses, unambiguous but confusing. The issue is addressed in two ways. First, braces { } and brackets [ ] are allowed, as well as parentheses. Second, and more interestingly, there are three precedence levels of the Boolean operations. && and &&& are conjunction, like &, but with medium and low precedence. So, A && B|C is allowed, and means A & (B|C), and A & B||C means (A & B)|C. A && B||C is illegal, just as A & B|C is. The low precedence operations are useful in long conditions, which usually consist of several joined clauses. To illustrate:

```
item : MediumPrice | item : LowPrice
    // It's cheap
&&& I ! : BoughtSomething
    // I haven't bought anything yet
&&& I : LowOnCash -->
    item: LowPrice| have (I, GiftCertificate)
    // I can afford it!
```

These syntactic tools, if used with common sense, allow users to write complex Boolean expressions reasonably readably, without too many parentheses or ambiguous-looking clauses.

The invention also allows quantifications over domains, to with:
(all x in PEOPLE, x: AWAKE).
Since domains are finite and fixed at compile time, quantification is a convenience rather than a qualitative necessity. There are five quantifiers, as are shown in the chart in FIG. 1, including some, all, no, one, and at-most-one. Quantifiers may work on subsets of their domain. For example:
one x: AUCTIONABLES such that owns (p,x), forSale(x) holds when exactly one auctionable item owned by p is for sale.

Quantifiers allow multiple variables, ordered or unordered. For example:

no x !+y: PERSON, x:HighBidder & y:HighBidder holds when there are not two people marked as HighBidder.

Comparisons, with respect to the domain of quantifications, may be used as well. For example:

some x<y: PERSON, canWorkTogether (x,y)

holds if and only if some pair of distinct people can work together. A quantifier with != would mean the same, but would induce an expression which would be twice as long.

There are activities which represent agents interacting with subsystems, typically making decisions. Each activity has a precondition, and a body of code. The body of code may include choices between several outcomes. Many things may be done at the same time, with the body being considered a sequence of transactions, each done atomically. The distinction between sequential and simultaneous composition is made very explicit.

Instantaneous commands are considered to happen atomically, as if executing inside a transaction. A great deal of computation can happen instantly with the present invention. The now command modifies entities' classifications, and maps and relations.

```
now Arwen: On // Change Arwen's class
now Huw!: Adult // Remove Huw's Adult class
now nextTo(Arwen, Huw); // set a relation
now !nextTo (Huw, Eleri); //remove a relation
now owner(CarvedSpoon)=Huw; // change a map
now spouse(Huw) = undefined; // Divorce Huw;
```

Looping and conditional branding branching have a fairly familiar syntax. Instantaneous commands may be executed simultaneously, modulo contradictions' with * (or "together-withs") being used as the operator for simultaneous composition. So, when two people get married, they stop being married to everyone else. For example:

```
now married(x,y)
*
for z = PERSON do
    if z != y then now !married(x,z) fi
    *
    if z != x then now !married(z,y) fi
rof
```

Note that all the changes to married, including those from the different iterations of a loop are simultaneous. A single for can represent nested loops over related variables over the same domain. For example:

for x<y: PERSON do now !nextTo(x,y) rof moves everybody apart. Just as for quantifiers, it avoids repeated work, since each distinct pair is only considered once, and pairs where x=y are not considered at all.

Choices made by agents describe the possible transitions of the system. This models, for example, presenting the user with a form, and buttons marked "APPROVE" and "REJECT". Some outcomes may be conditional, such that the APPROVE button may only be usable when the travel form is within corporate guidelines. Outcomes are named by way of documentation. Hence:

```
pick
    outcome APPROVE when travelForm:MeetsGuidelines :>
        now travelForm:Approved
    outcome REJECT :> now travelForm:Rejected;
end-pick
```

The inventive system only allows one choice to be made at a time. An activity can include several picks, separated by the sequencing operation AND-THEN. Sequencing is somewhat more expensive than simultaneous composition, so the invention provides a somewhat longer syntax for that.

Activities have preconditions which describe when they can be performed, plus bodies which are commands to be performed.

```
act logOn(p: PERSON)
    pre p !: On;
    pick
        outcome successfulLogon :> now p:On;
        outcome failedLogonAttempt :> skip;
    end-pick
end-act.
```

When the system is running, the activity is enabled when the precondition evaluates to true for some instantiation of the formal parameters with entities from the suitable domains. The rest of the activity is a sequence of instantaneous commands and pick commands, which may be executed as above. Only one activity will fire at a time.

Specifications are statements in branching temporal logic. The system checks each specification, printing a message that it is true, or hints at a counterexample when it is false. The semantics describe a program as a forking tree of states. At each state, some set of activities can fire. Each outcome of each enabled activity induces a transaction to another state.

The specification language uses CTL connectives to explore the tree. Each temporal modality has two parts. The first part quantifies over the set of possible next states; the second part is a temporal connective like "eventually". CTL traditionally uses single letters for modalities. Background research suggested that few businessmen were instantly comfortable with "EF" and "AG", therefore a more verbose but suggestive syntax is employed.

The branching component of a modality is either surely (CTL's A) or somehow (CTL's E). The temporal component may be henceforth (CTL's G), eventually (CTL's F), next (CTL's X), until (CTL's U), or until-maybe (a weak until, a derived operation in CTL). For example:

```
spec CarvedSpoonCanBeBought :>
    somehow eventually, some p:PERSON
        hasBought (p,CarvedSpoon);
``` specifies that it is possible on some computation path (EF) to find a state where the carved spoon has been bought. Similarly,

```
spec NobodyFixesCarvedSpoonIfTheyStartBroken :>
    CarvedSpoon:Broken ->
        (surely henceforth CarvedSpoon:Broken);
``` says that, if the carved spoon starts out broken, it will stay that way on all computation paths for all time (AG). There are also two combination modalities: forevermore=AG=surely henceforth, and possibly=EF=somehow eventually.

The inventive system and method also allows always as a synonym for AG, but only as the outer more temporal modality. Always is useful for specifying invariants. It is not allowed, however, in nested modalities, because it causes confusion whereby "always" is misinterpreted to mean "for all time, past as well as future" instead of the correct "for all future time". For example:

```
spec NobodyEverFixesCarvedSpoons :>
    // inner 'always' is illegal
    always (CarvedSpoon:Broken->
        always CarvedSpoon:Broken);
``` was misinterpreted as implying that if the carved spoon ever broke, it had to have been broken from the beginning.

```
spec NobodyEverFixesCarvedSpoons :> //this is OK
    always (CarvedSpoon:Broken->
        forevermore CarvedSpoon:Broken);
```

The words "henceforth" and "forevermore", though stilted, at least have fewer wrong connotations.

Temporal connectives may be nested. The example of NobodyEverFixesCarvedSpoons is a typical nesting for a monotonicity property; once a certain fact (CarvedSpoon-Broken) has been established, it remains true forever after. Other nestings are useful as well, as shown below:

```
spec SubmittedFormsCanGetPaid :>
    always, all f:TravelForm,
        f:Submitted & f !: Rejected -->
            (possibly f:Paid);
``` says that, in any state in which a travel form has been submitted, and hasn't been rejected, there is some computation path which can lead to it getting paid.

The travel form example is one of the smallest useful business applications which can readily be used as an example. One person, the traveler, fills out a form after going on a trip. His manager must approve or reject it. The manager may pass the form along to the manager's manager instead. The top manager of the organization cannot pass the form further along, of course.

The travel form object is described as follows. It has states including FilledOut, Submitted, Approved, and Rejected. The states Approved and Rejected are implemented as subclasses of the state Submitted because a form can only be approved or rejected after it has been submitted. To illustrate:

```
class TravelForm : Object.sub;
aspect filledOutNess. Status : TravelForm;
class FilledOut : TravelForm.filledOutNess
class Submitted : TravelForm.status
aspect status : Submitted;
class Approved, Rejected : Submitted.status;
```

The two aspects are connected by an invariant, if a form is approved, it must be filled out, such that:

```
spec onlyFilledOutFormsAreApproved :>
    always, all tf:TF, tf:Approved -> tf:FilledOut;
```

People, too, are given a very small description, they are either managers or not for this exercise. For an example, there are four people, as shown below:

```
class Person : Object.sub;
aspect management : Person;
class Manager : Person.management;
entity Arwen : Person := Person;
entity Bran : Person := Manager;
entity Cefyn : Person := Manager;
entity Dafyd : Person := Manager;
domain PERSON = (Arwen, Bran, Cefyn, Dafyd);
```

The actual management hierarchy is expressed as a relation, as shown below:

```
rel manages : (PERSON, PERSON), irreflexive,
    init (Bran, Arwen), (Cefyn, Bran), (Dafyd, Cefyn);
```

Additionally provided is an invariant which ensures that only Managers actually manage people. It has been found to be extremely valuable to write this sort of invariant to explain the intended meaning of the pieces of the model. Accordingly,

```
spec onlyManagersManage :>
    always all p: PERSON,
        (some q:PERSON, manages (p,Q))-->p:Manager;
```

Travelers are then connected to travel forms, as shown below:

```
domain TRAV = [Arwen, Bran]; //Persons who travel
entity tfa : TravelForm := TravelForm;
entity tfb : TravelForm := TravelForm;
domain TF = [tfa, tfb]; // Their travel forms.
rel owns : (TRAV , TF);
    init (Arwen, tfa), (Bran, tfb);
```

After a form has been submitted, someone will judge it. This relationship has an invariant as well, since at most one person may be judging the form at a given time. Accordingly:

```
rel judging : (PERSON, TF);
spec onlyOneJudge :>
    (surely henceforth, all tf:TF,
        at-most-one p : PERSON,
            judging (p, tf));
```

Travel forms may be filled out, as characterized below:

```
act fillOut(p : TRAV, tf : TF)
    pre tf !: FilledOut;
    now tf : FilledOut;
end-act;
```

Further, once the travel forms are filled out, they may be submitted to the traveler's Manager, as follows:

```
act submit (p : TRAV,tf:TF, mgr, PERSON)
    pre tf : FilledOut && owns(p,, tf)
        && tf !: Submitted && manages (mgr, p);
    now tf:submitted, judging(mgr, tf);
end-act;
```

The conjunct tf !: Submitted prevents a form from being submitted repeatedly.

An auxiliary relation is used to represent the act of one manager "passing the buck" to another manager. The term confusedBy (Bran, tfa) indicates that Bran has just given up on travel form A in confusion and that Bran's manager Cefyn must now judge the form. The term:

rel confusedBy: (PERSON, TF);

shows the buck passing.

The main activity of the application is when some manager mgr judges some travel form tf. This can only happen when the manager is the one judging the travel form, and when no judgment has been made on the form. The manager may choose to approve or reject it, or choose to pass the buck. However, people who have no managers cannot pass the buck, therefore, the confusing outcome has an extra test, as shown below:

```
set judge (mgr : PERSON, tf : TF)
    pre judging(mgr, tf) && tf !: Approved
        & tf !: Rejected:
    pick
        outcome good :>
            now !judging(mgr, tf), tf: Approved
        outcome bad :>
            now !judging(mgr, tf), tf: Rejected
        outcome confusing
            when (some sup : PERSON, manages(sup,mgr)) :>
                now !judging(mgr, tf), conductedBy(mgr, tf);
        end-pick
end-act;
```

When one person is confused by tf, then that person's manager must pick tf up and start working on it. Simultaneously, the confusion flag is turned off. To illustrate:

```
act pickUp (mgr : PERSON, tf:TF)
    pre (some p: PERSON)
        (manages(mgr, p) & confusedBy(p, tf)));
    now judging(mgr,tf);
        //these two things happen at once.
    for q : PERSON do
        now !confusedBy(q,tf): //unconfuse everyone
    rof
end-act.
```

At this point, a number of useful specifications are possible. Further program invariants may be asserted, such as that nobody is simultaneously listed as judging and confused by a form, and that nobody should ever judge their own form. This is conveniently expressed with the "at most one of" operation #, shown below:

```
spec onlyOneUseOfForm:>
    [surely henceforth, all p: PERSON, all tf:TF,
        owns (p,tf) # judging(p, tf) # confusedBy(p, tf)];
```

A more crucial property of the system is that it never gets stuck. Real approval systems have been known to violate this property. Specifically, it should always be the case that a travel form can get approved or rejected, as is shown below:

```
spec formsCanAlwaysGetDealtwith :>
    (surely henceforth,
        all tf:TF,
            somehow eventually.
                tf:Approved | tf:Rejected
    );
```

It is also useful to have specifications to check intuition. Specifically, in the running example, while it seems obvious that the "buck" can be passed, it must be actually possible and the specification should test to make sure that the top manager might have to deal with the form. For example:

```
spec maybeDafydHasToDoIt :>
    (somehow eventually, judging(Dafyd, tfa));
```

The inventive approach to specifications has been applied to cover aspects of program behavior including a few variants, and a few properties for diagnosis. As the model was being developed in testing, several times a specification was violated. Violation of a specification can indicate any one of the following: that there is a problem in the business process, such as a missing precondition on an activity; that there may be a problem in the specification itself, indicating a problem in the specification writers' understanding of the business application being evaluated; or, that there was a false positive which indicates that the business process is incomplete.

Working with the model checker gives a sense of confidence in the business process. Ordinary business process models give only a single description of the business process. The present model provides both a total, programmatic description of classes and activities and a partial, logical description of specifications. Getting the two descriptions to agree reveals a number of bugs and omissions. While the final application may still have some undiagnosed bugs and omissions, there is some assurance that the system will at least exhibit some desirable behaviors in spite of bugs.

Also, model checking provides a useful form of regression testing. Once a problem has been identified and solved and recorded as a spec, the system will continue to test it as the system evolves. So, the problem will either stay solved or the system will alert the user that it has "become" unsolved again.

The example also allows system exploration. For example, if a personnel subsystem is added, which allows hiring, firing, promotion, and demotion, it must be recognized that several of these functions will break the travel reimbursement process. In the running example, if Cefyn is demoted at the same time that Bran is confused by a travel form, the travel form could fall between the cracks. The system specs will detect the problem so that when organizational structure changes, suitable measures can be taken to update unfinished processes.

The so-called Strix inventive language has been implemented only as tylluan, a version of which was written explicitly for the invention yet translates correctly back to tylluan. The differences are largely syntactic (e.g., tylluan does not have chained variables in quantifiers or multiple picks in a single activity). The system has a straightforward parser written in javacc; the parsed program is translated to SMV, and run through the existing SMV model checker.

SMV is a BDD-based checker. Described herein are only the features which are used, and the SMV language description is mixed with the description of the translation. An SMV program consists of a number of modules, each of which declares some variables, and describes a part of the transition relation. Scalar variables may have Boolean or symbolic values from some fixed set; variables can also be instances of modules.

The inventive classes become SMV modules, used to aggregate data. SMV has no inheritance, so each class becomes a distinct SMV module, with local variables for each bit of data that the class might need. For example, the inventive language/process translates the person type by a module cls-person, with variables for the person's management and importance. These variables range over codes for all the subtypes in the management and importance aspects of person (e.g., the manager class is represented here by id-person-management-Manager-and another value for the case that the object has no classification in that aspect). Modules take formal parameters which are used to provide the initial values of these variable. Each module defines a part of the state-transition relation. The init( . . . ) assignments provide initial values for the variables; next( . . . ) assignments describe how variables change state across transitions. To illustrate in code:

```
MODULE cls-Person (formal-Person-management, formal-
Person-importance)
VAR
    v-Person-management : (none-Person-management,
        id-Person-management-Manager)
    v-Person-importance : (none-Person-importance,
        id-person-management-VIP);
ASSIGN
    init(v-Person-management) := formal-Person-
management
    next (v-Person-management) := v-Person-management;
    init (v-Person-importance) := formal-Person-
importance;
    next (v-Person-importance) := v-Person-importance
```

Instances of classes are declared as variables of the main program, initialized suitably. For example:

```
VAR
    Arwen : cls-Person (none-Person-management,
                        None-Person-importance)
```

System activities are converted to SMV modules used as asynchronously-parallel subprocesses. One transaction for the fillout process looks like the following:

```
MODULE proc-fillOut (tfa)
DEFINE
    precond := tfa.v-TravelForm-filledOutNess=id-
TravelForm-filledOutNess-FilledOut;
ASSIGN
    next (tfa.v-TravelForm-filledoutNess) := case
        precond : id-TravelForm-filledOutNess-
FilledOut;
        !precond: tfa.v-TravelForm-filledOutNess;
//***
        esac;
```

The DEFINE clause names an expression. The case expression is a conditional expression, taking the first branch whose condition is true.

There is no separate concurrent composition construct in SMV. Concurrent processes are module instances marked by the process keyword, as shown below:
VAR p-filledOut-tfa: process proc-filledOut(tfa)

As an additional complexity, the parameters of an SMV module are bound at compile time, not run time. Therefore, an instance of each SMV process must be started for each possible assignment of arguments. The fillOut activity takes a TRAV and a TF as arguments, so |TRAV|X|TF| process instances will be needed. The translation can thus get extremely expensive, creating vast numbers of processes very quickly.

Each instance of each outcome of an activity defined by the inventive language/process turns into a separate SMV process. Therefore SMV fairness constraints are needed saying that each activity is allowed to run infinitely often. (Note that, if an activity's preconditions are not satisfied, running the corresponding SMV process does not change anything, see the *** line above.

Each relation is implemented by a module, the manages relation by the rel-manages module. In code:

```
MODULE rel-manages
VAR
    at-Arwen-Bran: boolean;
    // ...
    at-Bran-Arwen: boolean;
    // ...
ASSIGN
    init (at-Arwen-Bran) :=0;
    next (at-Arwen-Bran) :=at-Arwen-Bran;
    //...
    init(at-Bran-Arwen) := 1;
    next) at-Bran-Arwen) := at-Bran-Arwen;
```

The relation module is used entirely for holding data. Queries on the relation become SMV accesses to members: manages(Bran-Arwen) becomes manages.at-Bran-Arwen, and changes to the relation become assignments to members. Note that each vector of arguments costs one bit. The reflexivity and symmetry conditions eliminate possible vectors of arguments (e.g., sorting them, so that married(Bran-Arwen) and married(Arwen-Bran) would be stored as at-Arwen-Bran), and thus conserve bits. Unchanging relations are compiled away completely.

Basic expressions become the natural calculations on SMV data (e.g., tf:approved becomes (tf.v-Submitted-status=Id-Submitted-status-Approved)). SMV has many of the boolean connectives which are used above. The others can be programmed (e.g., A^B^C^D is translated as !(A&B) & !(A&C) & (A&D) & !(B&C) & !(B&D) & !(C&D) & (A|B|C|D), where the last clause requires that at least one of the expressions be true, and the others say that no two are true.

Quantifiers are expanded. The inventive domains are fixed and known at compile time. For example, suppose DOM=[a,b,c], (all x:DOM, p(x)) will be translated as (p(a) & p(b) & p(c)). The translations for one and at-most-one are quadratic, as are the translations of ^ and #.

Both languages uses CTL as their underlying temporal logic. Translation of temporal modalities is mostly a matter of turning surely into A and henceforth into G. The inventive language has the weak until-p-until-maybe q holds when p remains true until q first becomes true, or forever if q never becomes true-but that is easily expressed in CTL. Each of the inventive specifications therefore becomes one SMV specification. The conversion is illustrated in pseudo-code in FIG. 2 with the inventive language being referred to as STRIX.

When SMV determines whether a spec is satisfied or not, it prints out the first few characters. It also prints out a counterexample for unsatisfied specs. Since an SMV program may have many specs, and since the specs that SMV uses may look quite different from the inventive language forms, in extreme case, the first few characters of the SMV spec may be all "("s—a module is defined called "spec" with constants for each specification name, and include that constant as the first conjunct of the specification:

```
MODULE spec
DEFINE onlyManagersManage := 1;
```

Model checking engines are based on NP-hard problems, and are quite sensitive to their inputs. Adding an entity or an activity may increase the running time from a few seconds to a few hours to a few eons. Experience with the language has lead to a number of programming patterns that sometimes can turn it back from hours to seconds.

Each vector of possible arguments to an activity generates one SMV process. So, the number of processes can be as bad as the product of the sizes of the domains. The language does no compile-time analysis, if the precondition of an activity instance can be determined to be false, then it does not generate a process for it. It is generally worth cutting down on the number of formal parameters to an activity. The "confusedBy" relation, with the pickup activity that it triggers, is a programmatic way to avoid a third argument in the judge activity. In the travel form example with four people, the three-argument version takes about twice as long. Similarly, a for loop is used to turn off confusedBy(q,tf) for all possible "confuses" q, rather than mentioning the one person who was actually confused as an argument.

SMV does not simply calculate whether a spec is true or false. If it is false, SMV attempts to produce a counterexample, in the form of a trace of the system execution which violates the spec. Some specifications, of course, do not have counterexample traces. For example, a counterexample to forevermore x:Blue is a trace leading to a state in which x is not Blue, but no single trace is a good counterexample for possibly x:Blue.

SMV also produces counterexample traces in terms of SMV variables and processes. The translation scheme is as transparent as possible, such that the name of the SMV process is built from the name of and binding of the inventive language process.

The inventive checking process is applied by the process flow which is illustrated in FIG. 3. The first step, at 301, is building a model for the business process, the model comprising a plurality of actions each having a precondition and a postcondition. Next, specifications for the properties which describe both the states of the business process and the order in which they may occur are constructed at step 302 (further detailed with reference to FIG. 4). With the model and specification in place, the final step is determining if the model satisfies the specifications, wherein failure to satisfy the specifications indicates that the model (and the underlying business application) is problematic and requires some modification. The determination is made at decisions box 303. If the specifications are satisfied, as indicated by the YES response, then the process exits at 304. If however, the specifications are not satisfied, as shown by a NO out of decision box 303, then a problem is indicated to the user/system by notification in step 305. In an automated version of the system, discussed below, a series of iterations may be conducted with variations on the model or the specification being invoked to more definitively locate the source of potential problems.

Figure 4:
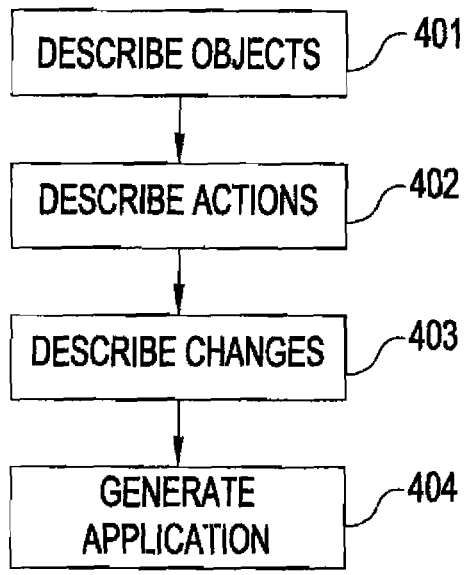
FIG. 4 illustrates a process flow for specifying a business process in the inventive language.

FIG. 4 provides a process flow for specifying a business process. At step 401, objects are described using a dynamic, multi-classification model as detailed above. At step 402, the system describes actions that can take place in terms of the classifications of the potential objects used in the action. Next, it is described, at step 403, how the classification of objects may change during actions (e.g., the buck passing example). Finally, an application is generated that ensures that actions take place when valid, at step 404. Clearly, once the language for the business application has been specified, one can utilize that as a precondition for performing model checking, as well as for writing the execution engine for the application.

The invention provides the language for modeling business applications and the process for specifying the business process. Additionally, the invention provides the process for using model-checking technology to verify temporal-logic specifications. The language is tuned for the issues and concepts of relevance to high-level business analysis. While the inventive language is not a general-purpose programming language, the programs are executable, either with or without user intervention. The language interpreter will have panes to show the classification hierarchies and relationships of all the entities, and a list of activities and their outcomes that can fire. This lets the user execute and explore the model. For extra ability to explore, the interpreter should allow saving and restoring system states, and going backward as well as forward.

One embodiment which is particularly desirable is doing simulation running the program automatically, making random choices of activity and outcome. If the activities and outcomes are annotated by costs and probabilities, the program can be run without human intervention and the cost of the process can be estimated. The simulator should be quite efficient, making hundreds of runs per second, accumulating statistics about the system's costs and bottlenecks.

The invention has been described with specific reference to several preferred implementations. It is to be understood that modifications can be made without departing from the spirit and scope of the invention as set forth in the appended claims.

Having thus described the invention, what is claimed is:

1. A computer-implemented method for a processing system for determining if business process application software satisfies certain predetermined properties, said method comprising the steps of:

said processing system:

building a model for the business process application software, the model comprising:

a data model of objects in a multiple dynamic classification hierarchy wherein objects may have multiple classes, and a control model comprising a plurality of actions on the objects each having a body of code and at least one of a pre-condition and a post-condition;

constructing specifications as finite state programs for predetermined properties, said specifications being statement in branching temporal logic and indicating both states of the business process with temporal connectives and an order in which the states may occur;

determining that the model satisfies the specifications for the predetermined properties, wherein the determination comprises:

parsing the specifications and converting the specifications to SMV (Symbolic Model Verifier) language;

running the specifications through an SMV model checking; and comparing the outcomes of each of the plurality of actions to the specifications to determine whether the outcomes violate said states and said order;

modifying at least one of said model, the business process, and the specifications when the model fails to satisfy the specifications; and iteratively repeating said determining that the model satisfies the specifications and said modifying until no outcomes violate said states and said order.

2. The method of claim 1 wherein said constructing specifications for the properties comprises the steps of:
describing objects in multiple, dynamic classifications;
describing process actions in terms of the classifications of the objects used in the actions; and
describing how the classifications of objects change during actions.

3. The method of claim 2 wherein said describing objects comprises expressing data about individual objects in classification and expressing data about several entities in terms of relationships and maps.

4. The method of claim 1 further comprising building an execution engine for said business process.

5. The method of claim 1 further comprising annotating actions and outcomes with costs and probabilities to facilitate said modifying.

6. The method of claim 1 wherein constructing specifications comprises expressing conditions for actions as one of conjunction, disjunction, implication, equivalence, an n-ary operating for precisely one of, and an n-ary operation for at most one of.

7. A program storage device readable by machine tangibly embodying a program of instructions executable by said machine for performing a method of determining if a business process satisfies certain properties, said method comprising the steps of:
building a model for the business process application software, the model comprising a data model of objects in a multiple dynamic classification hierarchy wherein objects may have multiple classes and a control model comprising a plurality of actions on the objects each having a body of code and at least one of a pre-condition and a post-condition;
constructing specifications as finite state programs for predetermined properties, said specifications being statement in branching temporal logic and indicating both states of the business process with temporal connectives and an order in which the states may occur;
determining that the model satisfies the specifications for the predetermined properties, wherein the determination comprises:
parsing the specifications and converting the specification to SMV (Symbolic Model Verifier) language;
running the specification through an SMV model checking; and
comparing the outcomes of each of the plurality of actions to the specifications to determine whether the outcomes violate said states and said order; and
modifying at least one of said model, the business process, and the specifications when the model fails to satisfy the specifications.

8. A computer system having at least one processing device for determining if a business process satisfies certain properties, comprising:
at least one building component for building a model for the business process, the model comprising a data model of objects in a multiple dynamic classification hierarchy wherein objects may have multiple classes and a control model comprising a plurality of actions on the objects each having a body of code and at least one of a pre-condition and a post-condition;
at least one specification component for constructing specifications as finite state programs for predetermined properties, said specifications being statement in branching temporal logic and indicating both states of the business process with temporal connectives and an order in which the states may occur;
at least one processing component for determining that the model satisfies the specifications for the predetermined properties, wherein the determination comprises:
parsing the specifications and converting the specifications to SMV (Symbolic Model Verifier) language;
running the specifications through an SMV model checking; and
comparing the outcomes of each of the plurality of actions to the specifications to determine whether the outcomes violate said states and said order; and
wherein at least one of said model, said business process, and said specifications when the model fails to satisfy the specifications to eliminate said problem.

* * * * *